United States Patent [19]

Hutter

[11] Patent Number: 4,587,085
[45] Date of Patent: May 6, 1986

[54] NUCLEAR REACTOR SAFETY DEVICE

[75] Inventor: Ernest Hutter, Wilmette, Ill.

[73] Assignee: The United States of America as represented by the United States Department of Energy, Washington, D.C.

[21] Appl. No.: 523,207

[22] Filed: Aug. 15, 1983

[51] Int. Cl.⁴ ............................................. G21C 7/00
[52] U.S. Cl. .................................................... 376/336
[58] Field of Search ......................... 60/529; 376/336

[56] References Cited

U.S. PATENT DOCUMENTS

| | | | |
|---|---|---|---|
| 2,284,082 | 5/1942 | Bloch | 60/529 |
| 2,307,504 | 1/1943 | Hastings | 60/529 |
| 2,924,483 | 2/1960 | Koch et al. | |
| 3,105,890 | 10/1963 | Mais | 60/529 |
| 3,283,581 | 11/1966 | DuBois et al. | 60/529 |
| 3,546,996 | 12/1970 | Grijalva et al. | 376/336 |
| 3,678,685 | 7/1972 | Low et al. | 60/529 |
| 3,936,350 | 2/1976 | Borst | |
| 3,940,311 | 2/1976 | Frisch et al. | |
| 3,976,543 | 8/1976 | Sowa | |
| 4,227,967 | 10/1980 | Zebroski | |

FOREIGN PATENT DOCUMENTS

| | | | |
|---|---|---|---|
| 235874 | 3/1960 | Australia | 376/336 |
| 2730300 | 1/1979 | Fed. Rep. of Germany | 60/529 |
| 268035 | 7/1950 | Switzerland | 60/529 |
| 569744 | 9/1977 | U.S.S.R. | 60/529 |

OTHER PUBLICATIONS

ANL/CT-74-10, Proposal for the Development of Self Actuated Shutdown Systems for LMFBR Plants,, pp. 34, 35, 44, 48, and 49.

*Primary Examiner*—Deborah L. Kyle
*Assistant Examiner*—Richard W. Wendtland
*Attorney, Agent, or Firm*—Hugh W. Glenn; Robert J. Fisher; Judson R. Hightower

[57] ABSTRACT

A safety device is disclosed for use in a nuclear reactor for axially repositioning a control rod with respect to the reactor core in the event of an upward thermal excursion. Such safety device comprises a laminated helical ribbon configured as a tube-like helical coil having contiguous helical turns with slidably abutting edges. The helical coil is disclosed as a portion of a drive member connected axially to the control rod. The laminated ribbon is formed of outer and inner laminae. The material of the outer lamina has a greater thermal coefficient of expansion than the material of the inner lamina. In the event of an upward thermal excursion, the laminated helical coil curls inwardly to a smaller diameter. Such inward curling causes the total length of the helical coil to increase by a substantial increment, so that the control rod is axially repositioned by a corresponding amount to reduce the power output of the reactor.

12 Claims, 12 Drawing Figures

NUCLEAR REACTOR SAFETY DEVICE

CONTRACTUAL ORIGIN OF THE INVENTION

The United States Government has rights in this invention pursuant to Contract No. W-31-109-ENG-38 between the U.S. Department of Energy and the University of Chicago representing Argonne National Laboratory.

BACKGROUND OF THE INVENTION

This invention relates to a safety device for use in a nuclear reactor. More particularly, this invention relates to a safety device for use with a control rod in a nuclear reactor such that in the event that the temperature of the reactor core rises above a normal operating level the device will axially reposition the control rod with respect to the reactor core.

A nuclear reactor typically includes a reactor vessel containing a core, said core comprising vertical elongated fuel assemblies and interspersed control rods. In a liquid metal fast breeder reactor (LMFBR) the fuel assemblies are usually supported from beneath the core, while the control rods ae suspended from control rod drive means disposed above the core. The fuel assemblies are disposed to provide a critical mass of nuclear fuel within the core so that a nuclear chain reaction is sustained and nuclear energy is produced. Coolant flows upward from the bottom of the reactor vessel, past the fuel assemblies and control rods, and out of the vessel, carrying energy produced by the chain reaction as heat to a heat exchange system.

The nuclear chain reaction is moderated by means of the control rods. The control rods may contain either a nuclear fuel, a neutron poison, or some combination of fuel and poison, depending on the design of the particular reactor. Regardless of composition, control rods are typically designed so that upward motion of the rods accelerates the chain reaction, and downward motion of the rods slows the chain reaction. The control rods may be individually axially repositioned as required to sustain the chain reaction by the control rod drive means. Under normal operating conditions the control rod drive means reposition the control rods at a very slow rate, on the order of an inch per minute. This slow rate maintains the chain reaction equilibrium and minimizes the thermal stresses in the reactor.

For maximum safety, nuclear reactors are designed to anticipate and respond appropriately to breakdowns due to either equipment malfunctions or natural disasters such as earthquakes. Under such emergency conditions, the control rod drive means are designed to rapidly force the control rods down into the reactor core at a rate of several feet per second. This rapid movement, known as a reactor "scram," immediately stops the nuclear chain reaction. Thus, if an upward thermal excursion should raise the coolant temperature above its normal safe operating level, the control rod drive mechanisms are activated automatically to scram the reactor. However, it would be desirable for the reactor to be safe even if the primary automatic safety system were to fail to activate, as may occur in a hypothetical "loss-of-flow-without-scram" incident. For that type of incident, it would be desirable to have a supplemental system which would drive the control rods downward into the core to stop or slow the chain reaction. Preferably, such a system would operate passively without external activation. Ideally, such a system would operate on the basis of physical principles and would require no moving mechanisms.

SUMMARY OF THE INVENTION

It is thus one object of the invention to provide a safety device for a nuclear reactor which in the event of a thermal excursion will drive a control rod into a nuclear reactor core.

It is another object of the invention to provide a safety device for a nuclear reactor which in the event of a thermal excursion will drive a control rod into a nuclear reactor core and which operates passively on the basis of physical principles.

It is yet another object of the invention to provide a safety device for a nuclear reactor which in the event of a thermal excursion will drive a control rod into a nuclear reactor core and which requires no moving mechanisms.

It is still another object of the invention to provide a safety device for a nuclear reactor which in the event of a thermal excursion will drive a control rod into a nuclear reactor core and which is adapted for use in LMFBR's.

Additional objects, advantages and novel features of the invention will be set forth in the following description.

In accordance with the invention, a device for driving a control rod into a nuclear reactor core in the event of a thermal excursion comprises a laminated ribbon of two materials having different thermal coefficients of expansion, said ribbon being helically wound or configured to form a helical tube having contiguous helical turns with slidably abutting edges. The material with the larger thermal coefficient of expansion forms the outer lamina of the tube, and the material with the smaller thermal coefficient of expansion forms the inner lamina. The helical tube has helical turns which are abuttingly or solidly stacked in the sense that adjacent edges of the helically configured laminated ribbon abut one another. The inventive device is interposed between the control rod and the control rod drive means. In the event of a thermal excursion of as little as 200° F., the temperature of the tube will be significantly raised by the overheated coolant flowing in contact with it. Because the outer lamina of the tube expands more than the inner lamina, the laminated ribbon will curl inwardly so that the tube will wind more tightly on itself and will be reduced in diameter. This results in a significant increase in the length of the tube. As the tube "grows" it drives the control rod at its lower end farther down into the reactor core, whereupon the repositioned control rod moderates the chain reaction.

It may be seen that the device of the instant invention requires no external activation system which may be subject to failure in emergency conditions, but instead operates passively on the basis of physical principles. The instant invention is therefore highly reliable in the event of a thermal excursion. The invention is also simple in design and construction and requires no moving mechanisms. In addition, the invention inherently responds in proportion to the severity of the thermal excursion, so that at higher coolant temperatures the lengthening of the tube is greater, and the control rod will be driven further into the core.

While the invention may be used in other types of reactors, it is particularly well suited to liquid metal fast breeder reactors (LMFBR's). These reactors are cooled by liquid sodium which under normal operating conditions is at a temperature of about 900° F. The reactor cores of LMFBR's are designed such that a relatively small change in the axial position of the control rods relative to the core has a significant effect on the rate of the chain reaction. Thus, in the event of a thermal excursion of about 200° F., the thermally sensitive tubes of the instant invention will lengthen sufficiently to drive the control rods far enough downward into the core to significantly moderate the chain reaction.

DETAILED DESCRIPTION OF THE INVENTION

The following is a detailed description of a preferred embodiment of the invention; other embodiments will be readily apparent to those skilled in the art.

The instant invention is a device for driving a control rod into a nuclear reactor core in the event of a thermal excursion. As may be seen in FIGS. 1A and 1B, the inventive device comprises a laminated ribbon of two materials having different thermal coefficients of expansion and helically wound or configured to form a helical tube 10 having contiguous slidably abutting helical turns. The material forming outer lamina 11 has a greater thermal coefficient of expansion than the material forming inner lamina 12. The helical tube 10 is formed with contiguous helical turns which are abuttingly or solidly stacked, in that adjacent edges 13 and 14 of the helically configured ribbon slidably abut one another.

Figure 1A:
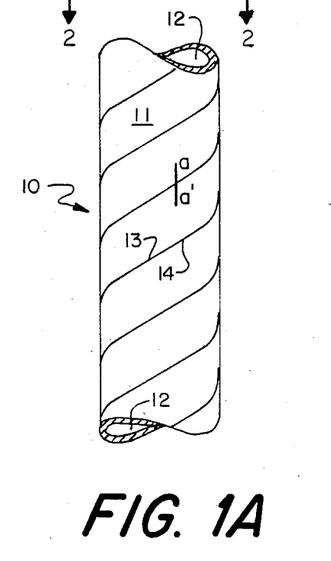
FIGS. 1A and 1B illustrate a section of the instant device at normal operating temperatures and at elevated temperatures, respectively, with changes in proportions exaggerated for clarity.
Figure 1B:
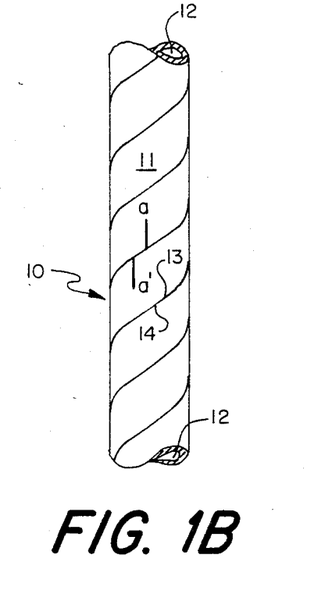

FIG. 1A illustrates a section of the helical tube 10 under normal reactor operating conditions. FIG. 1B illustrates the same section of tube 10 at elevated temperatures such as might occur in the event of an upward thermal excursion. The changes in proportions between FIGS. 1A and 1B have been exaggerated for the sake of clarity. As the helical tube 10 is heated, outer lamina 11 will expand more than inner lamina 12, creating a tendency in the laminated ribbon to curl inwardly. Because the ribbon is confined in a helical configuration, the curling action will cause tube 10 to wind more tightly on itself, resulting in a tube with a smaller diameter and a greater length. The effect of the winding motion is illustrated by hypothetical marks a and a' on adjoining edges of the ribbon. At normal operating temperatures the marks a and a' are aligned, as illustrated in FIG. 1A, but as tube 10 is heated and winds more tightly on itself the marks a and a' are moved apart as illustrated in FIG. 1B. It may be noted that the edge 13 and 14 of the ribbon still abut one another. The relative movement of the marks a and a' indicates the direction of the winding of the helically configured ribbon into a tube of smaller diameter and greater length. The increase in length due to the winding action is significantly greater than and in addition to any linear thermal expansion that will normally occur when an object is heated.

Figure 2:
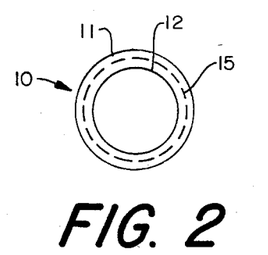
FIG. 2 is a horizontal cross-sectional view of one embodiment of the instant invention along line 2—2 of FIG. 1A.
Figure 3A:
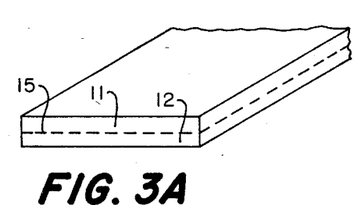
FIGS. 3A–D illustrate cross-sectional views of various embodiments of the laminated ribbon before it is helically configured into tube 10, showing possible variations in thickness and shape of the laminae.
Figure 3B:
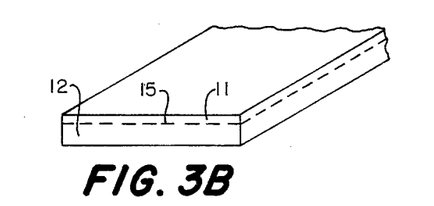
Figure 3C:
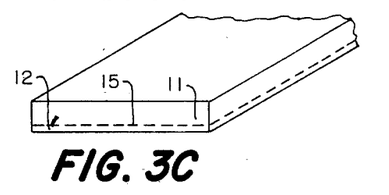
Figure 3D:
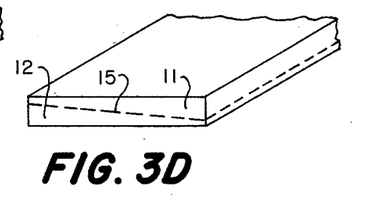

FIG. 2 is a cross-sectional view of the helecal tube 10 showing an embodiment of the invention wherein outer lamina 11 and inner lamina 12 are of substantially the same thickness. The two laminae meet at interface 15. It is understood that the two laminae 11 and 12 need not be of the same thickness, but that the laminated ribbon used may have laminae of unequal shapes and thicknesses, such as those illustrated in FIGS. 3A–D. The embodiments of laminated ribbon illustrated in FIG. 3 are examples and are not intended to limit the scope of the appended claims; other embodiments will be known or readily apparent to those skilled in the art. The particular embodiment chosen will depend on various parameters, such as the strength and thermal behavior of the materials of the two laminae, and the characteristics of the reactor in which the device will be used.

Figure 4:
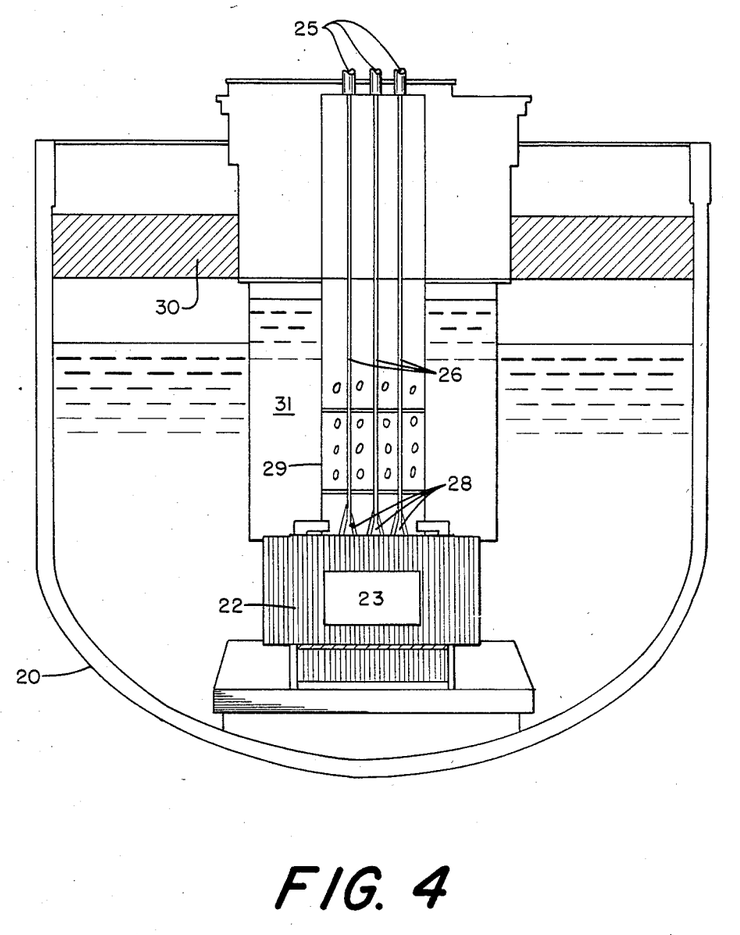
FIG. 4 illustrates a liquid metal fast breeder reactor in which the instant invention may be used.

FIG. 4 illustrates a liquid metal fast breeder reactor in which the instant invention finds particular utility. Reactor vessel 20 contains core barrel 22, which contains a plurality of fuel assemblies disposed therein to provide a critical mass of nuclear fuel to reactor core 23. Interspersed among the fuel assemblies are control rods, like the control rod 32 shown in FIG. 5, which moderate the nuclear chain reaction in core 23. The control rods may be axially repositioned as necessary to maintain reactor equilibrium by means of control rod drives 25. Control rod drives 25 operate on the control rods by means of main drive tubes, like the helical tube 37, shown in FIG. 5 each of which extends vertically downwardly from a control rod drive 25 to a control rod. Each main drive tube is fixedly connected by known means to control rod drive 25 and is housed within a shroud tube 26. Each shroud tube 26 is provided with a flared blunderbuss structure 28 at its lower end. The shroud tubes 26 are housed within sleeve 29 which provides structural support. The main drive tubes, shroud tubes 26 and sleeve 29 all extend through plug 30.

Coolant such as liquid sodium circulates throughout vessel 20, flowing upwardly through reactor core 23 and core barrel 22 into coolant pool 31. Some coolant flows upwardly into sleeve 29 and shroud tubes 26, both of which are provided with exit holes through which the coolant may flow into pool 31. The upper level of coolant pool 31 is slightly below the lower surface of plug 30.

Figure 5:
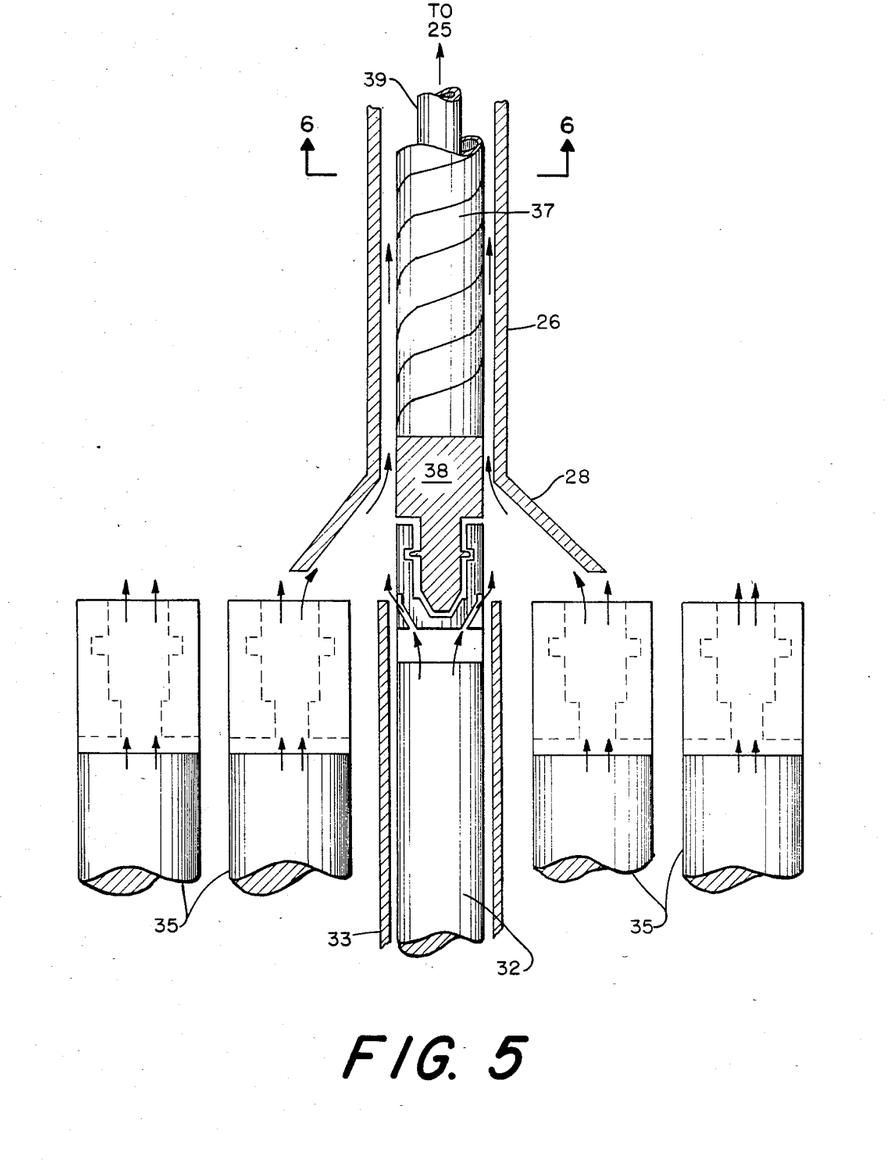
FIG. 5 illustrates the lower portion of the instant invention in operative relation to a control rod assembly which is in a slightly elevated position.

FIG. 5 illustrates the inventive device in operative relation to a control rod in the reactor system just described. The control rod is shown in a slightly elevated position.

FIG. 5 shows control rod 32 positioned within guide thimble 33 and surrounded by fuel assemblies 35. Only the upper portions of these elements are shown. As shown by the arrows, coolant flows upwardly past control rod 32 and the fuel assemblies 35 adjacent thereto into blunderbuss 28 of shroud tube 26. Shroud tube 26 houses a helical main drive tube 37 similar to the helically wound tube 10, which embodies the instant inventive concept. Main drive tube 37 is connected at its lower end to control rod 32 by gripper means 38 such as are known in the art, and is fixedly connected at its upper end to control rod drive 25 as hereinbefore described.

As may be seen in FIG. 5, the outer surface of the helical main drive tube 37 is in contact with liquid sodium coolant flowing upwardly into the space from control rod 32 and adjacent fuel assemblies 35 between main drive tube 37 and shroud tube 26. If a thermal excursion should raise the coolant temperature above its normal operating temperature, main drive tube 37 will respond to the higher temperature by exhibiting enhanced longitudinal thermal expansion as previously described in connection with the similar helical tube 20. This expansion will drive control rod assembly 32 farther down into core 23 whereupon control rod assembly 32 will moderate the rate of the nuclear chain reaction therein.

As is known in the art, main drive tube 37 may house gripper actuating shaft 39 which operates on gripper 38. Gripper designs are known by which a gripper may be axially repositioned a relatively short distance in relation to its actuating shaft without actuation of the gripper mechanism. Such a design is shown, for example, in U.S. Pat. No. 2,924,483, "Fuel Handling Mechanism" to Koch et al. It is contemplated that the gripper actuating shaft and gripper used in conjunction with the instant invention will also have this property of tolerance for moderate vertical displacement with respect to one another without actuation.

Figure 6:
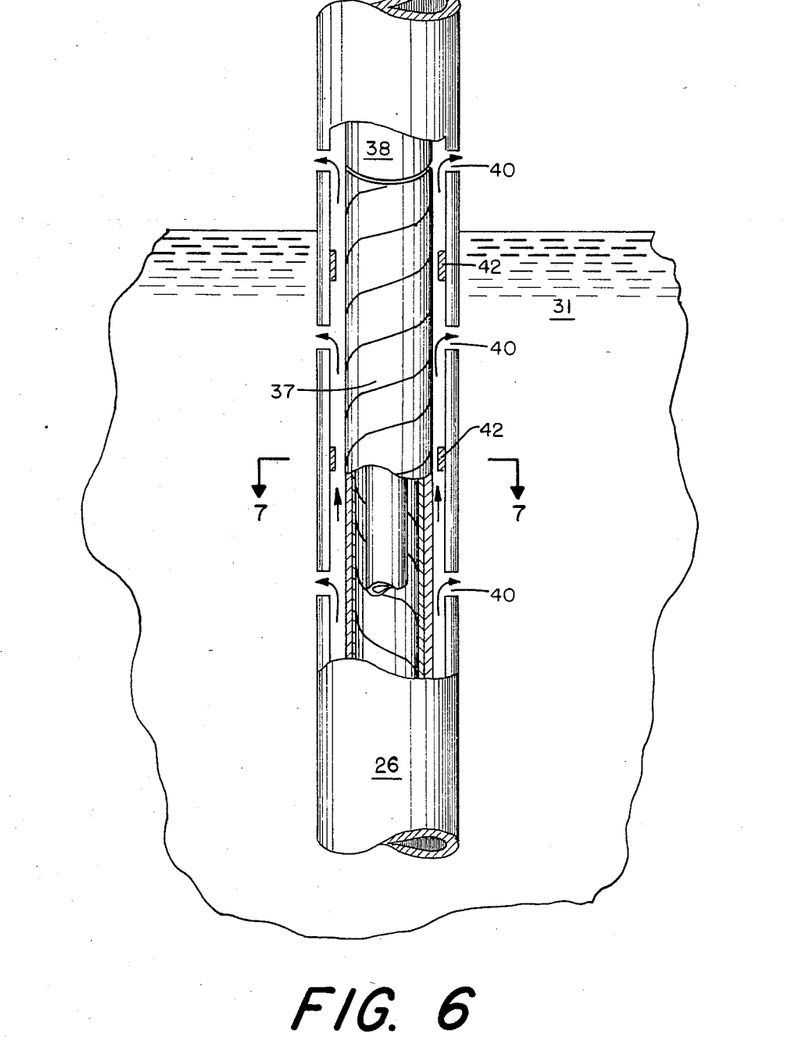
FIG. 6 is a vertical sectional view along line 6—6 of FIG. 5 showing the portion of the instant invention near the surface of the sodium pool.
Figure 7:
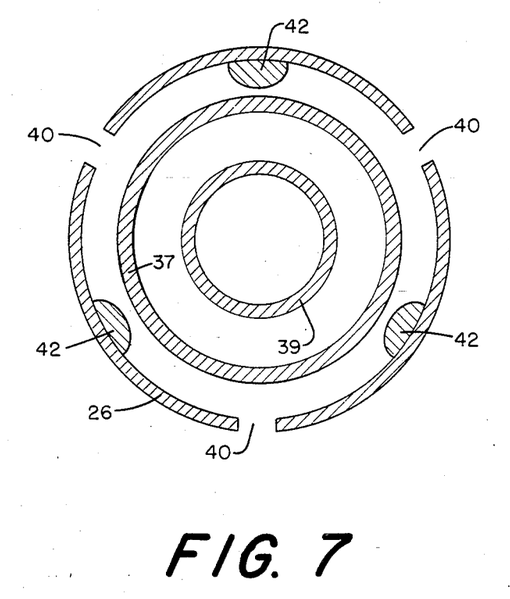
FIG. 7 is a horizontal sectional view along line 7—7 of FIG. 6.

It may be seen that the maximum heat transfer to the helical main drive tube 37 and thus the greatest thermal elongation occurs along that portion of main drive tube 37 which is in direct contact with the liquid sodium coolant. As illustrated in FIG. 6, the portion 38 of main drive tube 37 which is substantially above the level of liquid sodium pool 31 may therefore be of standard construction. Coolant exit holes 40 are provided at various elevations along shroud tube 26. A plurality of centering spiders 42 are likewise disposed along the length of shroud tube 26 to center main drive tube 37. These features are also illustrated in FIG. 7, which is an enlarged horizontal cross sectional view along line 7—7 of FIG. 6.

The instant invention as embodied in the helical main drive tube 37 is uniquely advantageous in that it operates passively on the basis of known physical principles and is therefore highly reliable. It is simple in construction and design and has no moving mechanisms, other than the slidably abutting helical turns of the helical tube 37. A further advantage is that the inventive device inherently responds in proportion to the severity of the thermal excursion, such that the enhanced longitudinal expansion increases with higher coolant temperatures.

Figure 8:
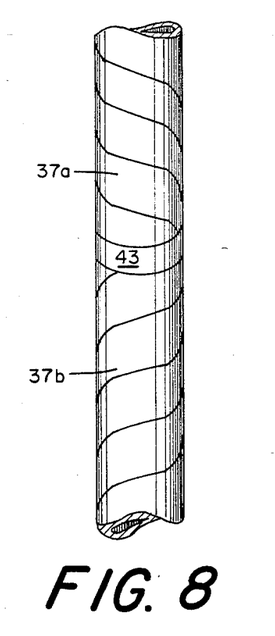
FIG. 8 illustrates a portion of an alternative embodiment of the invention.

It may be seen that as the laminated helical tube 37 of the instant invention winds more tightly on itself to expand longitudinally, the lower end of the helical tube 37 may be caused to twist or rotate. Control rod assembly 32 attached to the lower end of tube 37 may then likewise twist or rotate. This movement may be undesirable in some reactor designs. To reduce or substantially eliminate such rotation movement, an alternative embodiment of the instant invention may comprise two laminated ribbons, each helically configured into helical tubes but wound in opposite directions, as illustrated in FIG. 8, such that the helices of the two tubes 37a and 37b are of opposite pitch or chirality. The helical tubes 37a and 37b may be joined end-to-end by means of collar 43. As main drive tube 37 is heated by contact with the flowing coolant, the two segments 37a and 37b will expand longitudinally by winding on themselves in opposite directions. The rotations of the two segments will then tend to cancel each other out, so that little or no net rotation will be experienced by control rod assembly 32. As lower tube 37b may experience hotter coolant temperatures than upper tube 37a and therefore be subject to greater longitudinal expansion and greater rotation at its lower end, collar 43 may be positioned lower than the midpoint of the portion of main drive tube 37 which embodies the instant invention, so that lower tube 37b is shorter than upper tube 37a. Then, even if lower tube 37b exhibits more rotational motion per unit length by virtue of its hotter temperature, upper tube 37a will nevertheless exhibit rotation of about the same magnitude because it is longer. Therefore, the opposite rotations of helical tubes 37a and 37b will still tend to cancel each other out.

The instant invention may be manufactured by known metallurgical methods. A laminated ribbon may be prepared by joining together two strips of the materials to be used, for example by swaging. The laminated ribbon may then be helically wound into a tube with helical turns having slidably abutting edges. Alternatively, metallurgically bonded and extruded double-walled tubes can be manufactured, and a very thin spiral cut can be accomplished by means of an electron beam. Other methods will be apparent to those skilled in the metallurgical arts. It is imperative that the laminated ribbon be configured such that the material with the higher thermal coefficient of expansion forms the outer lamina of the tube.

The materials for the laminated tube are preferably selected from that group of materials whose properties in a nuclear environment are well characterized. Preferred choices include various types of steels which have been used extensively in the construction of nuclear reactors. For example, stainless steel which has a thermal coefficient of expansion of about $9.6 \times 10^{-6}/°F$. may be used for the outer lamina where the inner lamina could then be carbon steel having a thermal coefficient of expansion of about $6 \times 10^{-6}/°F$.

It is conservatively estimated that a 20' length of helical tubing made of these materials in accordance with the invention would "grow" 1.37" in the event of an upward thermal excursion of about 200° F. Repositioning of the control rods by this amount is sufficient to moderate the chain reaction in a LMFBR. This is to be compared with an increase of only 0.46" for a 20' length of conventional tubing made of only stainless steel for the same thermal excursion. The actual increase in length of the laminated helical tube of the instant invention will depend on other parameters such as the thickness and shape of each lamina, the width of the ribbon, and the angle at which the helix is wound.

Although the instant invention as described herein is especially effective in LMFBR's, its application need not be so limited. The instant invention can also be used in reactor designs other than LMFBR's, although the distance that the control rod will be repositioned may be less effective in moderating the chain reaction. The invention could also be used in any industrial setting in which temperature-sensitive control valves or safety valves are required. It is likely that even greater changes in length as a function of temperature will be achieved if the choice of materials is not limited to those suitable for use in a nuclear environment.

Clealy many modifications are possible in view of the above teachings. Variations in materials used and method of construction will vary with the contemplated use of the invention. Variations in the dimensions of each lamina, the composite laminated ribbon, and the final tube will be apparent to the skilled artisan. In addition, for some reactor designs it may be preferable if adjacent edges of the helix do not abut one another at all temperatures. Such variations are contemplated as being within the scope of the appended claims. The foregoing description of a preferred embodiment is not intended to limit the invention to the precise form disclosed. The embodiment was chosen and described in order to best explain the principles of the invention and its practical applications.

The embodiments of this invention in which an exclusive property or privilege is claimed are defined as follows:

1. In a nuclear reactor having a core, a coolant for contacting and cooling the core, at least one control rod movable axially relative to the core for varying the power output of the reactor, and control means for moving the control rod to regulate the power output,
a safety device to afford additional protection against an upward thermal excursion of the core, such safety device comprising: a laminated helical ribbon configured as a tube-like laminated helical coil having contiguous helical turns with slidably abutting edges, and means connecting such helical coil in an operative relationship between the control means and the control rod, the laminated helical ribbon having outer and inner laminae made of different materials having different thermal coefficients of expansion, the material of the outer lamina having a greater coefficient of expansion than the material of the inner lamina, the laminated helical coil being in a position to receive heat from the coolant, the helical coil being heated by an upward thermal excursion which is thereby effective to cause the helical coil to wind up to a smaller diameter, the winding up of the helical coil being operative to produce a substantial increment in the total axial length of the helical coil, whereby the increment in the length of the helical coil produces axial movement of the control rod relative to the core to reduce the power output of the reactor independently of the position of the control means.

2. A safety device according to claim 1, the coolant being in the form of a pool of coolant surrounding the core and the control rod, the laminated helical coil being positioned substantially at or below the surface of the pool of coolant.

3. A safety device according to claim 1, in which the material of the outer lamina is stainless steel, and the material of the inner lamina is carbon steel.

4. A safety device according to claim 1, in which the laminae of the ribbon are swaged together.

5. A safety device according to claim 1, in which the laminated ribbon is helically wound with slidably abutting edges to form the helical coil having its turns abuttingly stacked.

6. A safety device according to claim 1, in which the laminated helical coil comprises an extruded laminated tube provided with a very thin helical cut to form the laminated helical ribbon.

7. In a nuclear reactor having a core, a coolant for contacting and cooling the core, at least one control rod movable axially relative to the core for varying the power output of the reactor, and control means for moving the control rod to regulate the power output,
a safety device to afford additional protection against an upward thermal excursion of the core, such safety device comprising: first and second laminated helical ribbons configured as first and second tube-like laminated helical coils having opposite helical pitch, each of the helical coils having contiguous helical turns with slidably abutting edges, and means connecting such first and second helical coils end-to-end in an operative relationship between the control means and the control rod, each of the laminated helical ribbons having outer and inner laminae made of different materials having different thermal coefficients of expansion, the material of the outer lamina having a greater coefficient of expansion than the material of the inner lamina, the laminated helical coils being positioned to receive heat from the coolant, the helical coils being heated by an upward thermal excursion which is thereby effective to cause each of the helical coils to wind up to a smaller diameter, the winding up of each of the helical coils being effective to produce a substantial increment in the combined axial length of the helical coils, whereby the increment in the combined length of the helical coils produces axial movement of the control rod relative to the core to reduce the power output of the reactor independently of the position of the control means, the winding up of the first and second helical coils being in opposite directions of rotation, so that the rotations produced by the first and second helical coils tend to neutralize each other.

8. A safety device according to claim 7, in which said first and second laminated helical ribbons comprise helical coils wound in opposite helical directions with slidably abutting edges to produce abuttingly stacked helical turns.

9. A safety device according to claim 7, in which the first and second laminated helical coils comprise an extruded laminated tube provided with first and second sections having very thin helical cuts of opposite pitch to form the laminated helical ribbons.

10. In a nuclear reactor having a core, a pool of coolant for surrounding and cooling the core, at least one control rod movable axially relative to the core for varying the power output of the reactor, and control means for moving the control rod to regulate the power output,
a safety device to afford additional protection against an upward thermal excursion of the core, such safety device comprising: a laminated helical ribbon configured as a tube-like laminated helical coil having contiguous helical turns with slidably abutting edges and a drive member extending in an operative relationship between the control means and the control rod, the laminated helical coil constituting a portion of such drive member, the laminated helical ribbon having outer and inner laminae made of different materials having different thermal coefficients of expansion, the material of the outer lamina having a greater coefficient of expansion than the material of the inner lamina, the laminated helical coil haing at least a portion thereof in contact with the coolant to receive heat from the coolant, the helical coil being heated by an upward thermal excursion which is thereby effective to cause the helical coil to wind inwardly to a smaller diameter, the inward winding of the helical coil being operative to produce a substantial increment in the total axial length of the helical coil whereby such increment produces axial movement of the control rod relative to the core to reduce the power output of the reactor independently of the position of the control means.

11. A safety device according to claim 10, in which the material of the outer lamina is stainless steel and the material of the inner lamina is carbon steel.

12. A safety device according to claim 10, in which the laminated helical coil comprises the laminated helical ribbon wound helically with slidably abutting edges to produce abuttingly stacked helical turns.

* * * * *